United States Patent [19]

Higashiguchi

[11] Patent Number: 4,687,527

[45] Date of Patent: Aug. 18, 1987

[54] METHOD OF FORMING FLOCK PATTERNS

[75] Inventor: Shigehiko Higashiguchi, Tokyo, Japan

[73] Assignee: Kabushiki Kaisha Tokyo Horaisha, Tokyo, Japan

[21] Appl. No.: 770,192

[22] Filed: Aug. 28, 1985

Related U.S. Application Data

[63] Continuation-in-part of Ser. No. 523,469, Aug. 16, 1983, abandoned.

[51] Int. Cl.[4] .......................... B32B 31/20; B32B 5/02; B32B 27/24

[52] U.S. Cl. .......................................... 156/72; 156/234; 156/241; 156/277; 427/200; 427/206; 428/90; 428/914

[58] Field of Search ............... 156/241, 234, 235, 230, 156/277, 332, 344, 72, 279; 428/90, 914; 427/200, 206; 2/65, 243 B, 244, 246

[56] References Cited

U.S. PATENT DOCUMENTS

| | | | |
|---|---|---|---|
| 4,314,813 | 2/1982 | Masaki | 156/234 |
| 4,396,662 | 8/1983 | Higashiguchi | 156/234 X |
| 4,438,533 | 3/1984 | Hefele | 156/277 X |
| 4,738,517 | 2/1979 | Gardner | 428/90 X |

*Primary Examiner*—Donald E. Czaja
*Assistant Examiner*—Thomas Bokan
*Attorney, Agent, or Firm*—Burns, Doane, Swecker & Mathis

[57] ABSTRACT

A predetermined pattern is printed on a surface of a material on which a flock pattern is desired, using crosslinking type synthetic resin as the printing ink and utilizing the printing method such as the screen printing process. A solidly flocked paper is then applied on the pattern formed of the ink, and is heated and pressed together, so that the crosslinking reaction takes place in the synthetic resin. Thus, when the flocked paper is peeled off from the surface of the material, a flock pattern of the predetermined shape is formed thereon.

5 Claims, 16 Drawing Figures

METHOD OF FORMING FLOCK PATTERNS

CROSS REFERENCE TO RELATED APPLICATION

This application is a continuation-in-part of copending application Ser. No. 523,469, filed Aug. 16, 1983, now abandoned.

BACKGROUND OF THE INVENTION

The present invention relates to a method of forming flock patterns on a material, and more particularly to a method of forming flock patterns on a material on the surface of which a predetermined pattern is printed with an adhesive material, and then solidly flocked paper is applied thereon with pressure and heat so that the flock on the paper is transplanted on the material according to the printed predetermined pattern.

Conventional methods for forming flock patterns on a surface of a material, such as the fabric surface of a shirt, by transplanting flock thereon, are disclosed, for example, in Japanese Utility Model Publication Nos. 54-38963 and 54-7413, and Japanese Patent Publication No. 53-35619. According to these conventional methods, a piece of paper to which an adhesive of weak adhesive power is applied is electrostatically flocked, and then a hot melt adhesive is applied to the tips of the short fibers of the flock on the paper according to a predetermined pattern, thereby forming a layer of the hot melt adhesive for transplanting the flock according to the pattern. Next, the adhesive layer pattern on the flocked paper is applied on the surface of the fabric, such as a shirt, with pressure and heat, thereby fusing the adhesive layer on the surface of fabric according the pattern. Thus, the fused adhesive forming the predetermined pattern holds the flock of the flocked paper on the surface of the fabric. Therefore, when the flocked paper is peeled off from the fabric after the adhesive has been cooled and has set, the flock on the paper is transplanted on the surface of the fabric according to the predetermined pattern formed by the adhesive layer for holding the flock.

Thus, when a pattern consisting of flock is to be formed on a fabric according to the conventional methods, a pattern should first be formed with adhesive on the solidly flocked paper.

This means that when no selections for the pattern formed by the adhesive on the flocked papers is performed by consumers, the papers with such patterns become useless.

Further, the conventional methods have the disadvantage that when a predetermined pattern of flock is to be formed and transplanted on a fabric, the pattern should first be formed on the flocked paper with an adhesive.

There has been a further disadvantage in the conventional methods, as will be described below. For example, as shown in FIG. 1, suppose that a hot-melt thermoplastic synthetic resin 2 is used as the patterned adhesive for transplanting the flock 4 planted on the flocked paper 6 to the fabric surface 8. The synthetic resin 2 which is fused by the applied heat adheres to the fabric surface 8. The flock 4, however, consists of very short and ultra-fine fibers of the length of about 0.2 to 1 mm, generally, which is planted on the paper with an adhesive of weak adhesive power. Thus, as shown in FIG. 1, the hot melt adhesive 2 may go through the middle and reach the root portions of the short fibers of the flock, as well as adhering to the tips of the fibers of the flock 4 planted on the paper 6. When the paper 6 is peeled off from the fabric 8 under these circumstances, there appear portions of the flock transplanted on the fabric 8 at which the hot melt adhesive 2 has impregnated to and dried and hardened at the roots of the flock which now forms the outward tips of the fibers of the flock transplanted on the fabric 8, as shown in FIG. 2.

Thus, the flock pattern transplanted and formed on the fabric with predetermined pressure and heat applied thereon under these circumstances tends to have an inferior texture of rough touch and poor outlook.

U.S. Pat. No. 4,138,517 discloses, as prior art, various known methods of ornamenting articles of clothing such as T-shirts. According to one of the disclosed methods, a structure of thermoplastic material in one or more colors is placed on an item of clothing such as a T-shirt, and then transferred to the T-shirt under heat and pressure to form a predetermined desirable pattern.

According to another prior method, a colorless adhesive material in liquid form is first applied to a fabric in a configuration of a desired final design. Then, flock is deposited on the applied adhesive while the adhesive is still wet and sticky to form a desired flock pattern.

The above U.S. Patent also states that since the adhesive bond is not sufficiently strong, the flock can easily separate from the textile article as when it is washed.

U.S. Pat. No. 4,314,813 reveals, as prior art, two processes of transferring flock in a desired pattern using a hot-melt adhesive material. The first process, which is also disclosed in Japanese Patent Publication No. 36058/1978, essentially comprises the steps of:

(1) flocking short fibers on a release paper sheet;
(2) printing a transfer pattern on another sheet with an ink containing a heat-sublimable dye;
(3) applying a hot-melt adhesive to the exposed surface of the transfer pattern of the ink;
(4) peeling the pile layer off the release sheet and placing the pile layer over the transfer sheet; and
(5) applying an adhesive to the other face of the pile layer.

According to the above process, however, as pointed by the inventor Masaki, the heating time is prolonged, and the use of the hot-melt adhesive makes the surfaces of the short fibers lose comfortable touch.

The invention disclosed in U.S. Pat. No. 4,314,813 was proposed to eliminate the above shortcomings. However, since a hot-melt adhesive is used on a pile layer, the surfaces of the short fibers still lack comfortable touch. In addition, as the hot-melt adhesive is applied to the short fibers which have been flocked and dyed, design patterns cannot be produced in multiple colors.

U.S. Pat. No. 4,438,533 shows an electrostatic flock coating method. In this disclosed method, flock fibers are electrostatically attracted also to a material surface devoid of an applied adhesive. Therefore, it is necessary to provide equipment for preventing the flock fibers from being scattered out of a desired area. Furthermore, those flock fibers which are not bonded by the adhesive have to be removed after the flocking step. Such flock fiber removal is tedious and time-consuming.

In view of the aforesaid drawbacks of the conventional process, it is an object of the present invention to provide a method capable of forming a desired design pattern of flock fibers, differently colored if required, on one surface of a material such as a fabric, using a flocked sheet or mount, a silk screen printing apparatus, silk screens of desired pattern, and a heating presser such as an iron, while requiring no electrostatic flocking agent.

Another object of the present invention is to provide a method of transferring a flock pattern of flock fibers to one surface of a material without employing a conventional patterned flock transferring material, by printing a design pattern in the form of an adhesive layer of synthetic resin on the material surface as by the screen printing process, then applying flock fibers on a flock sheet or mount endways to the adhesive layer, pressing with heat the flock fibers against the adhesive layer as with a heating presser such as an iron to bond the flock fibers to the adhesive layer in the design pattern, and peeling the flock sheet off the material surface to transfer the bonded flock fibers from the flock sheet to the material in the design pattern.

DETAILED DESCRIPTION OF THE PREFERRED EMBODIMENTS

Figure 1:
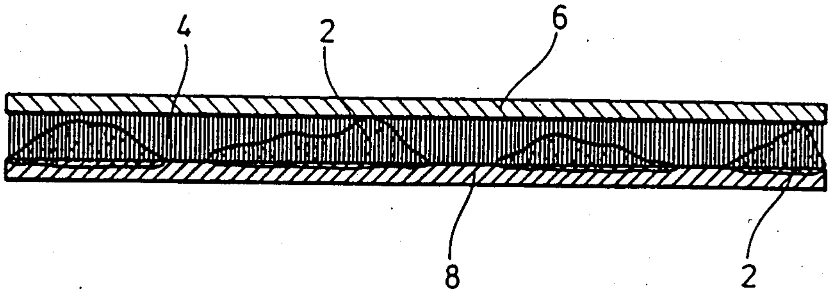
FIG. 1 is a diagrammatic cross sectional view showing the operation of transplanting flock from a flocked paper according to a conventional method, according to which a pattern of a hot melt adhesive is formed on a flocked paper.
Figure 2:
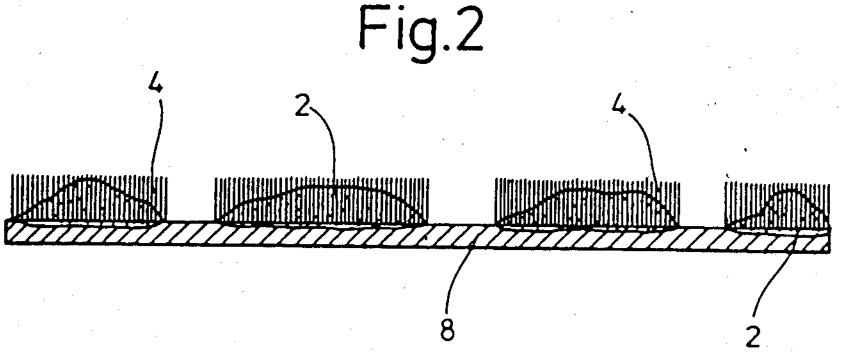
FIG. 2 is diagrammatic cross sectional view showing the fabric surface such as a shirt with the flock pattern transplanted thereto according to the method of FIG. 1.
Figure 3:
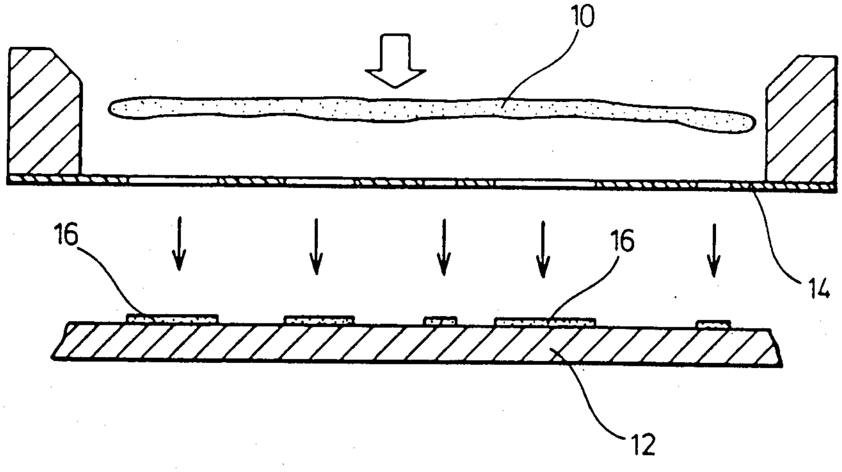
FIG. 3 is a diagrammatic vertical cross sectional view showing the operation according to the present invention of forming a predetermined pattern with a synthetic resin on a fabric surface according to the screen printing process.
Figure 4:
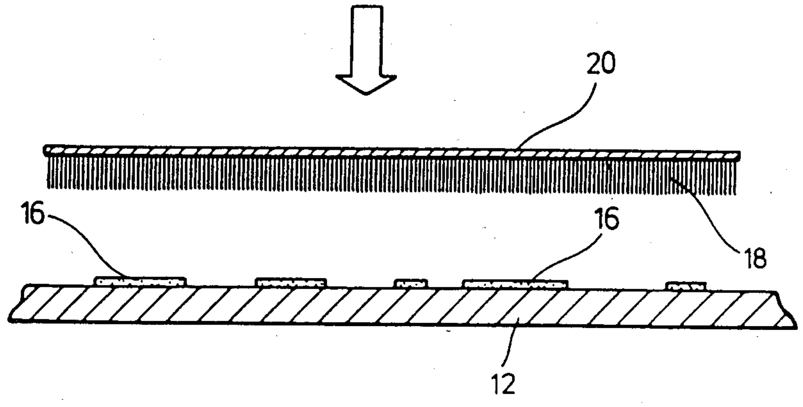
FIG. 4 is a diagrammatic vertical cross sectional view showing the operation according to the present invention of superposing a solidly flocked paper on the synthetic resin pattern formed on the fabric surface.
Figure 5:
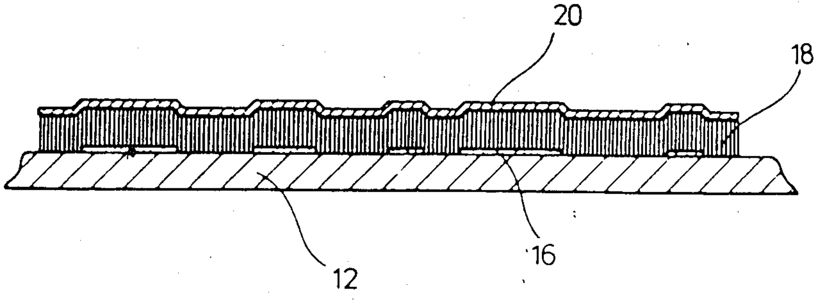
FIG. 5 is a diagrammatic vertical cross sectional view showing the state according to the present invention in which the flocked paper is superposed on the synthetic resin pattern formed on the fabric.
Figure 6:
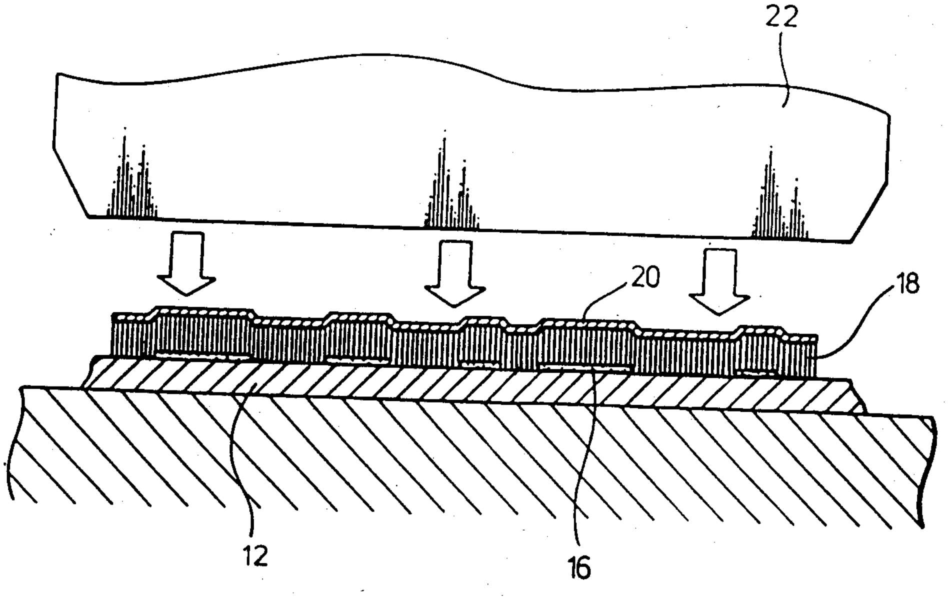
FIG. 6 is a diagrammatic vertical cross sectional view showing the operation according to the present invention of heating and pressing the flocked paper on the fabric.
Figure 7:
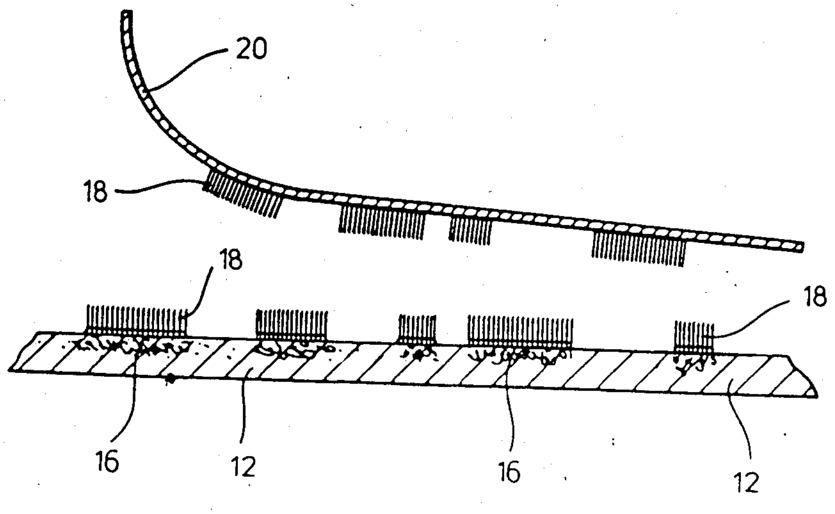
FIG. 7 is a diagrammatic vertical cross sectional view showing the operation of peeling the flocked paper off from the fabric according to the present invention, thereby forming a flock pattern on the surface of the fabric according to a predetermined pattern.

Synthetic resins can be generally divided into two broad categories one of which is thermosetting synthetic resin and the other of which is thermoplastic synthetic resin.

Further, synthetic resins can be classified into three groups, i.e. non-crosslinking type synthetic resins which do not present a crosslinking reaction, the so-called self crosslinking type synthetic resins in which the reactive groups contained in the synthetic resins react by themselves thereby crosslinking the synthetic resins, and the reactive crosslinking type synthetic resins, the reactive groups of which do not react by themselves and crosslink only in the presence of reagents.

The synthetic resins suitable for the present invention are those of self-crosslinking type or reactive crosslinking type which are used as the so-called binders of printing inks.

As is well known, the synthetic resins used as binders not only have the function of binding the pigments together which constitute the ink, but also impregnate the fibrous tissues such as papers and cloths constituting the surface to be printed, and hold together these fibrous tissues and the pigments printed on the surface of the tissue, thereby assuring good adherence therebetween.

According to the present invention, taking into account the characteristic of the synthetic resins of the self-crosslinking type or of the reactive linking type which are prepared to have the function of the binder, the types of resins are utilized as ink used in the silk screen printing, and the adhesive layer for transplanting flock in the form a predetermined pattern is printed on the material on which the flock pattern is to be formed i.e. fabric surfaces such as shirts.

The synthetic resin adhesives used in the present invention comprise acrylic copolymer, acrylic-vinyl acetate copolymer, vinyl acetate, denatured vinyl acetate, synthetic elastomer and polyurethane resin. Furthermore, acrylic ester is preferably used as a binder, which includes a solid content of 46 wt %, water 5 wt % and emulsifier 49 wt %.

Thus, according to the present invention, a synthetic resin of the self-crosslinking type or of the reactive cross-linking type prepared with the addition of a crosslinking agent, which is selected from being water-soluble, water-dispersible, or the solvent types is used as the printing ink 10. Then, the ink 10 is printed on a fabric surface 12 such as a shirt in the form of a predetermined pattern according to a printing process, i.e. the silk screen printing using silk screen 14. Thus, an adhesive layer 16 for transplanting flock in the form of the pattern is formed on the fabric 12. Further, the tips of the flock 18, planted on the solidly flocked paper 20, is applied on the adhesive layer 16, before the same is dried, then heated and pressed together. As a result of the above process, the adhesive layer 16 for transplanting flock is dried compulsorily under a predetermined pressure so that the tips of the flock 18 planted on the paper i.e. mount 20 adheres only to the flock transplanting adhesive layer 16 printed on the fabric 12 in the form of the predetermined pattern. Next, when the flocked paper 20 is peeled off from the fabric 12, the flock 18 planted on the paper 20 comes off therefrom relatively easily and is transplanted to the surface of the fabric 12 according to the predetermined pattern. Thus, the flock pattern consisting of short fibers is formed on the surface of the fabric 12.

After the flock transplanting adhesive layer 16, having the form of the predetermined pattern, is printed on the surface of the fabric 12, with the ink containing the above-described synthetic resin as the main component, the tips of the flock 18 on the flocked paper 20 are superposed thereon before it is dried, and heated and pressed thereto by a heater press device such as an iron 22. Thus, the synthetic resin, constituting the flock transplanting adhesive layer 16, printed on the fabric 12 in the form of the predetermined pattern, is dried and the water content thereof is evaporated, one surface thereof penetrating into the fibrous tissues constituting the surface of the fabric 12 and the other surface thereof being pressed against the tips of the flock 18 on the paper 20. Thus, the crosslinking reaction takes place not only in the synthetic resin of the adhesive layer 16 itself, among the polymers of the resin, but also between the synthetic resin 16 and the tips of the flock 18 or between the synthetic resin 16 and the fibrous tissues constituting the surface of the fabric 12 penetrated by the synthetic resin 16.

As the result of this crosslinking reaction, due to the synthetic resin 16, the tips of the flock 18, planted on the paper 20, firmly adheres to the surface of the fabric 12 through the flock transplanting adhesive layer 16.

If the flocked paper 20 is peeled off from the surface after the adhesion is completed, the portion of the flock having the same form as that of the flock transplanting adhesive layer 16, printed and formed on the surface of the fabric 12, is taken off from the paper 20 to the fabric surface, thereby completing the transplantation, i.e., the predetermined pattern made of the flock 18 is formed on the surface of the fabric 12.

Another embodiment of the present invention will be described with reference to FIGS. 8 through 14. Those parts in these Figures which are identical to those in the preceding embodiment are denoted by identical reference numerals, and will not be described in detail.

According to the embodiment illustrated in FIGS. 8 through 14, a first design pattern (or letters) is printed on one surface of a fabric such as of a shirt, and a second design pattern is formed on the first design pattern. In other words, different design patterns are successively formed on one object to provide a multicolored composite design pattern that is more complex than a single monotonous design pattern.

Figure 8:
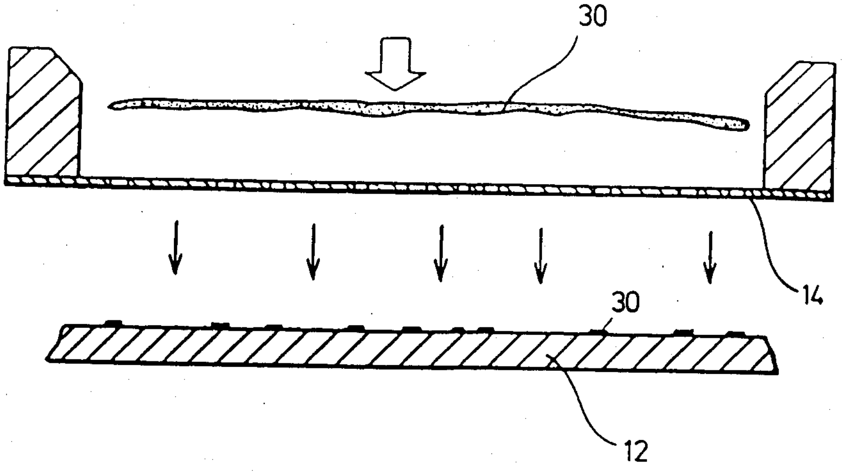
FIG. 8 is a diagrammatic vertical cross-sectional view showing the manner in which a coloring material or ink comprising a pigment is printed in a certain planar frame-like design pattern on a fabric such as of a shirt by the silk screen printing process.
Figure 9:
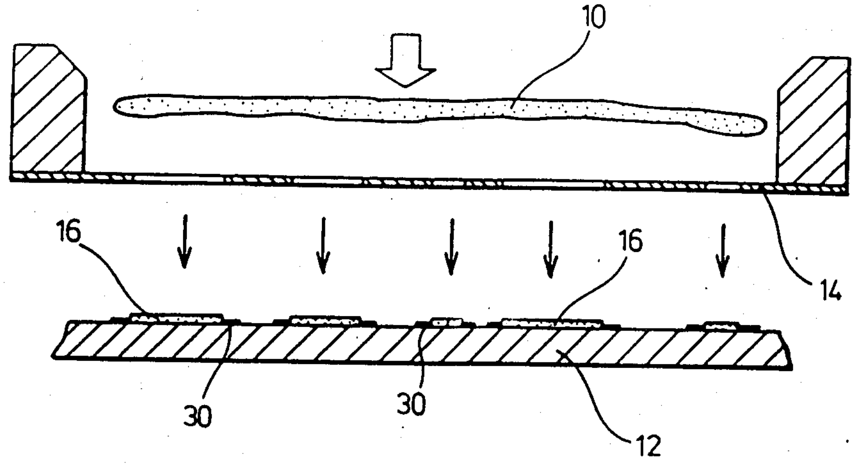
FIG. 9 is a diagrammatic vertical cross-sectional view showing the manner in which an adhesive layer of thermoplastic synthetic resin is printed in a design pattern on the fabric within the colored frame-like pattern of the pigment by the silk screen printing process.

As shown in FIG. 8, a first design pattern 30 is printed on one surface of a fabric 12 through a silk screen 14 by the silk screen printing process. The first design pattern 30 is formed of an ordinary printing ink comprising a pigment. The first design pattern 30 is a frame-like pattern which may be of any desired configuration, that may represent letters such as "NEW", for example. The first design pattern 30 is then air-dried or forcibly dried so that the pattern 30 will be firmly anchored to the fabric. Then, as shown in FIG. 9, a printing ink 10 of the same type as that of the preceding embodiment is printed through a silk screen 14 on the fabric 12 within the frame-like first design pattern 30. As a result, the printing ink 10 is applied as a thin film within the frame-like first design pattern 30, the thin film serving as an adhesive layer 16 for transferring and bonding flock fibers as described below.

Figure 10:
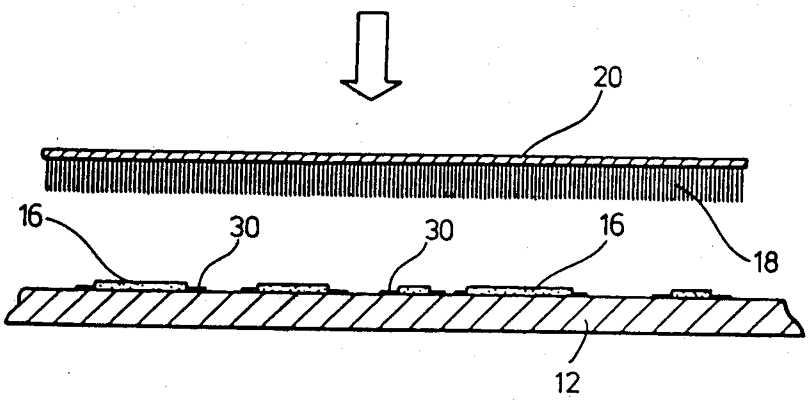
FIG. 10 is a diagrammatic vertical cross-sectional view illustrative of the manner in which a flocked sheet supporting flock fibers is held against the patterned adhesive layer of thermoplastic synthetic resin on the fabric.
Figure 11:
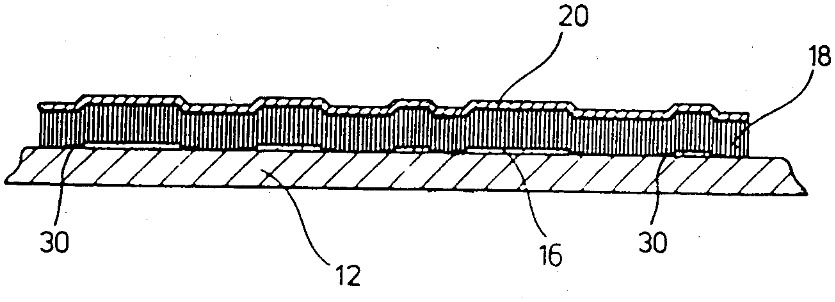
FIG. 11 is a diagrammatic vertical cross-sectional view of the fabric, the patterned adhesive layer, and the flocked sheet which are put together.
Figure 12:
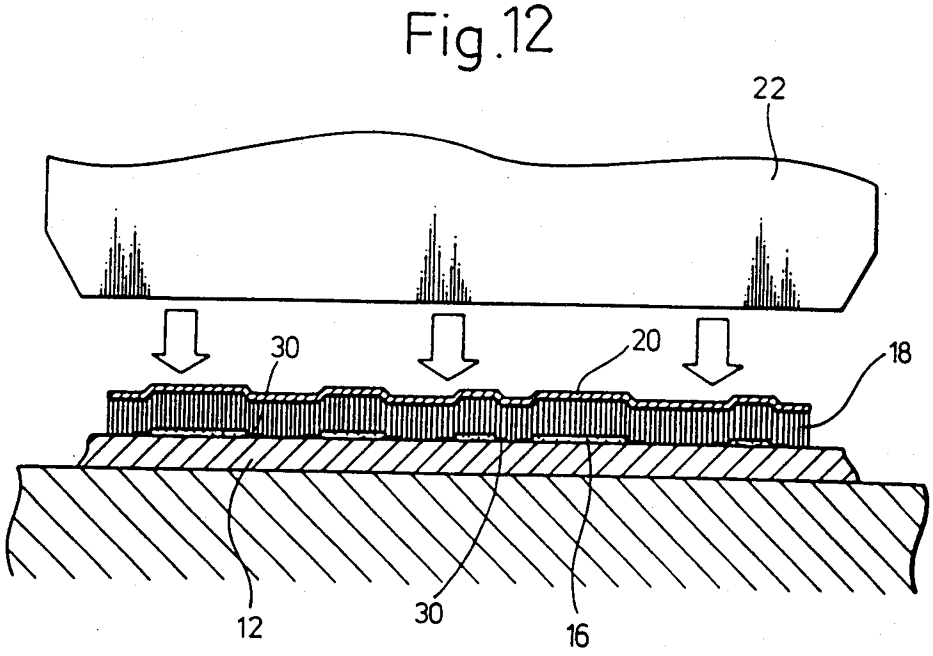
FIG. 12 is a diagrammatic vertical cross-sectional view showing the manner in which the flocked sheet is pressed against the fabric.

Before the adhesive layer 16 is dried, flock fibers 18 on a flocked sheet or mount 20 are applied endways to the adhesive layer 16 as shown in FIGS. 10 and 11. Then, a heating presser 22 such as an iron is pressed against the back of the flocked sheet 20 to press and heat the flock fibers 18 and the adhesive layer 16, as shown in FIG. 12. The ends of only those flock fibers 18 which are placed on the adhesive layer 16 are therefore bonded with heat and pressure to the adhesive layer 16. At this time, the first design pattern 30 has already been dried and hardened, it is not affected by the heat and pressure applied to bond the flock fibers 18.

Figure 14:
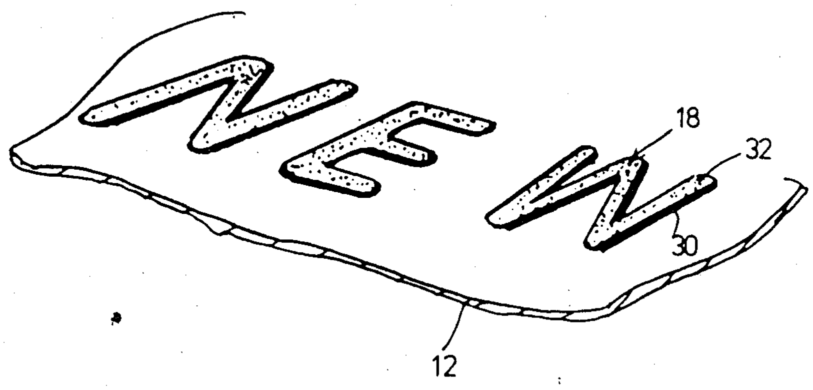
FIG. 14 is a perspective view of the three-dimensional flocked pattern within the planar pattern.
Figure 13:
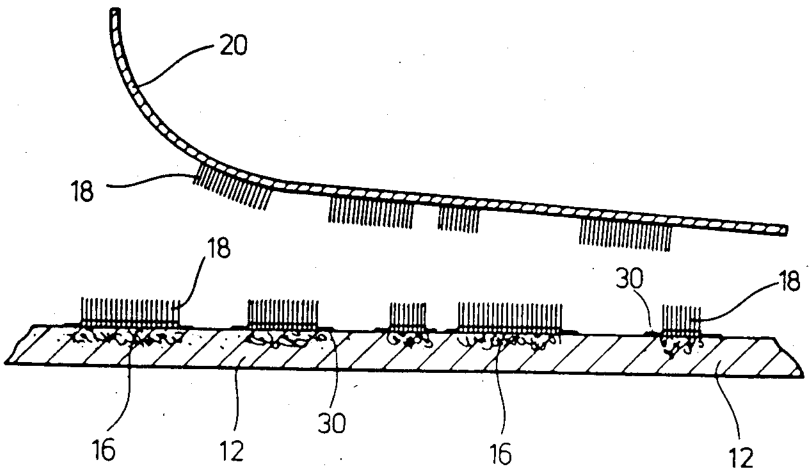
FIG. 13 is a diagrammatic vertical cross-sectional view showing the manner in which the flocked sheet is peeled off the fabric, leaving a three-dimensional pattern of flock fibers on one surface of the fabric.

After the flock fibers 18 have been anchored to the fabric 12, the flocked sheet 20 is peeled off the fabric 12 to cause the bonded flock fibers 18 to be transferred from the flocked sheet 20 to the fabric 12, as illustrated in FIG. 13. Now, a second design pattern 32 composed of the transferred flock fibers 18 is formed on the fabric 12, the flock fibers 18 being free of any printing ink on their distal ends or tips as shown in FIG. 14.

According to the second embodiment, therefore, the second design pattern 32 of the flock fibers 18 is produced within the profile of the first design pattern 30. The first design pattern 30 represents planar letters or a planar figurative configuration, whereas the second design pattern 32 displays three-dimensional letters or a three-dimensional figurative design. The composite pattern of the first and second patterns 30, 32 is aesthetically appealing and gives a unique impression.

Figure 15:
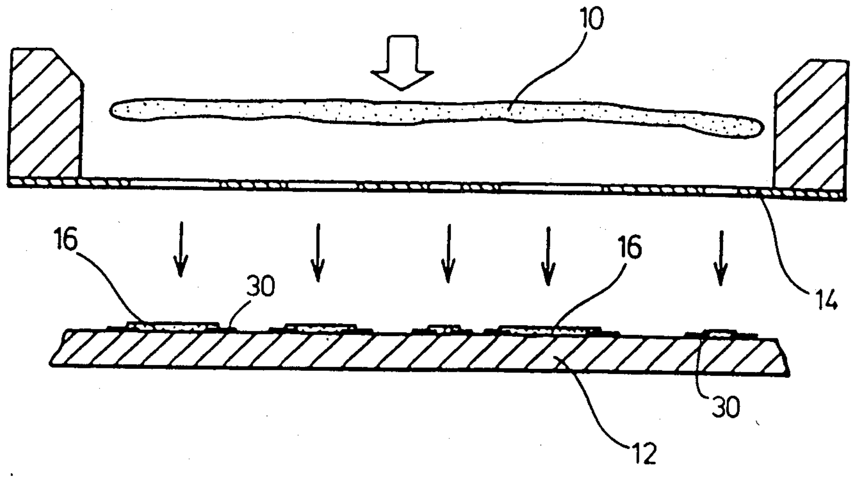
FIG. 15 is a diagrammatic vertical cross-sectional view illustrating an adhesive layer applied in overlapping relative to the edges of a planar design pattern.
Figure 16:
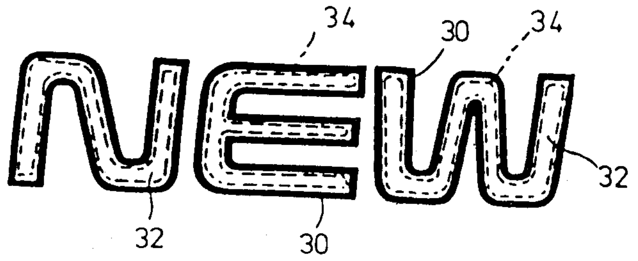
FIG. 16 is a plan view of a flocked pattern including a fuzzy pattern on the edges of the planar design pattern shown in FIG. 15.

FIG. 15 shows still another embodiment of the present invention. According to this embodiment, a printing ink 16 composed of a pigment is printed in overlapping relation to the edges of a frame-like first design pattern 30 on a fabric 12, and flock fibers 18 are anchored to the ink or adhesive layer 16 to provide a second design pattern 32. Inasmuch as the flock fibers 18 of the second design pattern are attached in an upstanding position to the fabric 12, the first design pattern 30 can be seen through the flock fibers 18 and recognized as a fuzzy pattern 34, as shown in FIG. 16. The composite design pattern of FIG. 16 can also exhibit a unique design on the fabric 12.

Thus, according to the present invention, flock patterns can be firmly attached to the material such as fabric surfaces by means of the reaction of the flock transplanting adhesive layer formed of a synthetic resin. Therefore, flock patterns of good outlook and excellent texture can be formed on fabric surfaces.

Further, a self-crosslinking type synthetic resin, or a reactive crosslinking type synthetic resin prepared with the addition of a crosslinking agent, which is selected from the group consisting, of water-soluble, water-dispersible, and organic solvent soluble types of synthetic resins which from solutions having the viscosity of about 20,000 to 70,000 cps, is used as the printing ink in the screen printing process for printing the predetermined pattern on the fabric on which the flock pattern is desired. The crosslinking reaction of the above-described synthetic resin solution constituting the printing ink is utilized for the purpose of transplanting the flock of the paper to the fabric.

Thus, the crosslinking reaction spreads over the flock, the synthetic resin and the fabric surface so that the flock pattern is firmly attached to the fabric surface. Further, as the crosslinking reaction takes place only in the limited specified region, the predetermined pattern is sharply formed by the flock transplanted on the fabric, realizing sharp definition without deformation from the predetermined pattern. Further, as the flock transplanting adhesive layer is heated and pressed with the tips of the flock planted on the flocked paper superposed thereon before the surface of the flock transplanting adhesive layer is dried, the crosslinking reaction of the resin is further enhanced due to the compulsory drying of the flock transplanting adhesive layer thus formed and the crosslinking between the adhesive layer and the flock or the fabric becomes more firm. Thus, the texture of the flock pattern formed on the fabric is excellent.

The present invention has been described above by referring to preferred embodiments according to the present invention. The present invention, however, is not limited to the embodiments described above. It goes without saying that a variety of modifications is possible without going out of the spirit of the present invention, for example, by substituting a plate for the fabric such as a shirt as the material on which the flock pattern is to be formed.

What is claimed is:

1. A flock pattern forming method comprising the steps of:

(a) printing a solution of a synthetic resin capable of being cross-linked on a surface of a material using a screen printing process, on which a predetermined pattern is to be formed thereby forming a flock transplanting adhesive layer having the form of said predetermined pattern on said surface;

(b) superposing flock solidly planted on a mount on said adhesive layer before said adhesive layer is dried;

(c) drying said adhesive layer by heating under a predetermined pressure thereby cross-linking the synthetic resin and attaching the tips of said flock on said mount to said surface of the material; and (d) peeling said mount thereby transplanting a portion of said flock to said surface of said material to form a flock pattern in said predetermined pattern.

2. A flock pattern forming method as claimed in claim 1 wherein before said solution is printed on said surface of the material, a pigment is printed on said surface and air-dried or forcibly dried to form a planar design pattern on said surface.

3. A flock pattern forming method as claimed in claim 2 wherein said solution is printed on said surface in at least partially overlapping relation to said planar design pattern.

4. A flock pattern forming method as claimed in claim 1, wherein said synthetic resin is selected from the group of water soluble, water dispersible, and organic solvent soluble types.

5. A flock pattern forming method as claimed in claim 2 wherein said pigment is printed by the screen printing process.

* * * * *